No. 868,622. PATENTED OCT. 15, 1907.
C. A. ARBEY.
LOCKING ARRANGEMENT FOR NUTS, SCREWS, &c.
APPLICATION FILED MAR. 16, 1907.

Inventor:
Charles Alphonse Arbey
By T. Walter Fowler
his atty

Witnesses:
C. W. Fowler
M. H. Darg

UNITED STATES PATENT OFFICE.

CHARLES ALPHONSE ARBEY, OF BESANÇON, FRANCE, ASSIGNOR TO LA CONTINENTALE FIXATOR, OF PARIS, FRANCE.

LOCKING ARRANGEMENT FOR NUTS, SCREWS, &c.

No. 868,622.

Specification of Letters Patent.

Patented Oct. 15, 1907.

Application filed March 16, 1907. Serial No. 362,651.

*To all whom it may concern:*

Be it known that I, CHARLES ALPHONSE ARBEY, accountant, a citizen of the French Republic, and residing at 38 Rue Charles Nodier, Besançon, Department of Doubs, France, have invented certain new and useful Improvements in Locking Arrangements for Nuts, Screws, and other Rotatable Devices, of which the following is a specification.

The present arrangement relates to a locking arrangement for nuts, studs, screws, cocks and other devices which it is desired to prevent from turning accidentally. The locking device of the arrangement consists of an elastic helix sprung upon a cylindrical or slightly conical portion of the nut or other object; the helix in its normal state constringes the shank so as to lie in close contact therewith. This helix is anchored at one extremity to a fixed object with relation to which the nut must not turn, for instance, to the object traversed by the bolt which receives the nut, and it is wound in a direction such that if its free extremity is turned in the direction of the screwing of the nut, the helix uncoils, while if it is turned in the direction of unscrewing, the helix grips upon the cylindrical part of the nut and so opposes the unscrewing by a constrictive frictional effect which increases in proportion to the force exerted upon the nut.

By way of example the annexed drawing shows two applications of the object of the invention.

Figure 1:
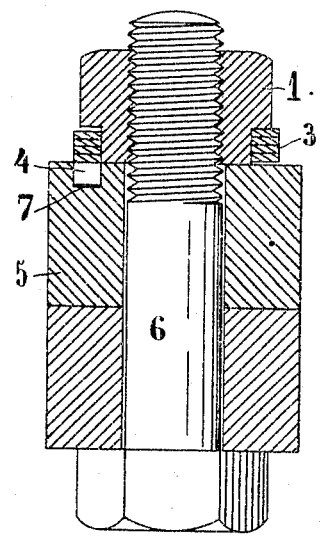
Figure 4:
Figure 2:
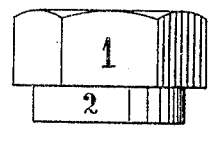
Figure 3:
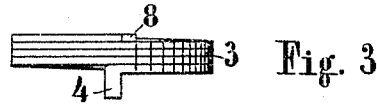
Figure 5:
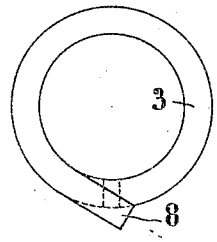
Figure 6:
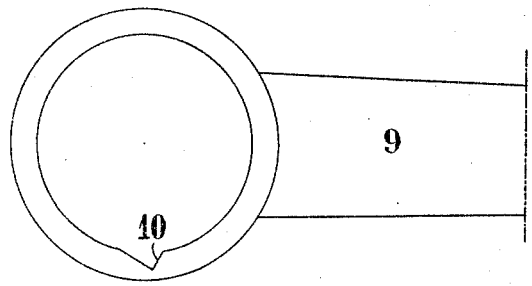
Figure 7:
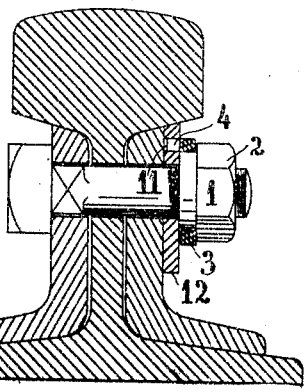
Figure 8:
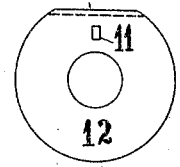

Figure 1 is a section taken along the axis of a non-slacking nut screwed upon a bolt. Fig. 2 represents the nut, Fig. 3 its helix or coil, and Fig. 4 a releasing spanner separately in elevation. Fig. 5 indicates the helix and Fig. 6 shows the spanner in plan separately. Fig. 7 is a section of a rail and fishplates assembled with bolts having non-slacking nuts with stop-washers. Fig. 8 represents a washer.

The nut (Figs. 1 and 2) comprises a flat-sided head 1 and a cylindrical shank or portion 2. Around the latter is sprung the constringing elastic helix 3, one end 4 of which is cranked. In the object 5 through which the bolt 6 passes, a small cavity 7 is formed for instance by punching in order to receive the extremity 4 of the helix. When the nut is screwed up and the helix is stopped by the cavity 7, the friction of the cylindrical portion 2 against the helix tends to uncoil this latter, so that no appreciable resistance is opposed to the screwing of the nut. On the other hand, if it is attempted to unscrew the nut, the helix carried round and tightened by friction, grips immediately upon it by its constrictive action and opposes any movement in this direction. Unscrewing or slackening is thus prevented automatically and with certainty. To render it possible indeed it is necessary to press upon the free end 8 of the helix, for example by the aid of a suitable spanner 9 having a notch 10 arranged to fit the extremity 8 so as to maintain this helix uncoiled while the nut is unscrewed. It will be noted from an inspection of Fig. 5 that the end 8 of the helix is approximately tangential to the helix and the notch 10 in the key or spanner 9, is correspondingly shaped.

In the arrangement indicated in Figs. 7 and 8, the extremity 4 of the helix is engaged in a slot 11 in a washer 12 which is itself prevented from turning with relation to the rail, for instance by means of a flat part 13 bearing against one of the flanges of the latter or against any other convenient adjacent projection.

The invention is applicable to nuts of all kinds and all shapes, cap nuts, milled round nuts, nuts with split or perforated heads, etc., bolts, screws, valves and all other parts of which the accidental rotation is to be prevented.

Having thus described my invention what I claim as such and desire to secure by Letters Patent, is:—

1. The combination with a rotatable nut having a substantially cylindrical shank portion, of a locking device for said nut, said device comprising an elastic helix having one end adapted to be anchored on a fixed body, the other end of said helix being free and said helix constringing the shank on said rotatable nut.

2. The combination with a rotatable nut having a shank portion made substantially cylindrical, of a locking device comprising an elastic helix surrounding said shank portion, said helix having one end free and having the opposite end cranked, said cranked end adapted to engage with a fixed body to which the rotatable nut is applied, said helix constringing the shank of the rotatable nut, substantially as herein described.

3. The combination with a rotatable nut having a shank portion of substantially cylindrical form, of a locking device for said nut, said device comprising an elastic helix surrounding said shank portion, said helix having a free end and a cranked end, and a fixed body having a cavity into which said cranked end enters, said helix constringing the shank portions of the rotatable nut.

4. The combination with a rotatable nut having a cylindrical shank portion, of a locking device for said nut said device comprising an elastic helix adapted to surround and constringe the shank of said nut and having one end anchored to a fixed body and the other end free, said anchored and free ends being so located that the path of the helix from the anchored to the free end represents the direction in which the rotatable nut is not allowed to rotate.

5. The combination with a fixed member and a rotatable nut, of a locking device intermediate of said member and nut, said device comprising an elastic helix and said rotatable nut' having a shank portion embraced by the helix and adapted to be constringed by the latter, said helix having a free end and a cranked end, said cranked end being engaged with said fixed member, and the free and cranked ends of the helix being so located that the path of said helix from the cranked to the free end represents the direction in which the rotatable nut is not allowed to rotate.

6. The combination with a rotatable nut having a shank portion of an elastic helix, said helix constringing the shank on said nut and having one end adapted to be anchored to a fixed body and the other end free, said unchored and free ends being so located that the path of the helix from the anchored to the free end represents the direction in which the rotatable nut is not allowed by the constringent helix to rotate, the constringent effect of the helix adapted to be released by a key when it is desired to rotate the rotatable nut in said direction.

7. The combination with a rotatable nut having a shank portion, of a locking device for said nut, said device comprising an elastic helix constringing the shank of said nut, said helix having one end adapted to be anchored to a fixed body and one end free, said free end being disposed tangentially to said helix, and said anchored and free ends being so located that the path of the helix from the anchored to the free end represents the direction in which said body is not allowed by the constringent helix to rotate, the tangential end of the helix being adapted for engagement with a key when it is desired to rotate the nut in a direction in which said member is not allowed by the constringent helix to rotate.

In witness whereof I affix my signature in presence of two witnesses.

CHARLES ALPHONSE ARBEY.

Witnesses:
ALFRED DUPUY,
DANIEL WEHRLIN.